(12) United States Patent
Ribarov

(10) Patent No.: US 11,391,210 B2
(45) Date of Patent: Jul. 19, 2022

(54) DYNAMIC THERMAL LOAD MONITORING AND MITIGATION FOR AIRCRAFT SYSTEMS

(71) Applicant: United Technologies Corporation, Farmington, CT (US)

(72) Inventor: Lubomir A. Ribarov, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 55 days.

(21) Appl. No.: 16/843,349

(22) Filed: Apr. 8, 2020

(65) Prior Publication Data

US 2020/0332716 A1 Oct. 22, 2020

Related U.S. Application Data

(60) Provisional application No. 62/835,064, filed on Apr. 17, 2019.

(51) Int. Cl.
*F02C 7/14* (2006.01)
*F02C 7/18* (2006.01)
*F02C 7/224* (2006.01)

(52) U.S. Cl.
CPC ............... *F02C 7/14* (2013.01); *F02C 7/185* (2013.01); *F02C 7/224* (2013.01); *F05D 2260/213* (2013.01); *F05D 2260/98* (2013.01)

(58) Field of Classification Search
CPC .... F02C 7/14; F02C 7/22; F02C 7/222; F02C 7/224; F02C 7/232; F02C 7/236; F05D 2260/205; F05D 2260/207; F05D 2260/213; F05D 2260/232; F25B 27/02; F28D 1/0408; F28D 7/0066; F28D 7/0091; F28D 9/0093; F28F 9/0234
See application file for complete search history.

(56) References Cited

U.S. PATENT DOCUMENTS

| | | | |
|---|---|---|---|
| 9,254,920 B2 * | 2/2016 | Zhou | F02K 3/06 |
| 10,364,750 B2 * | 7/2019 | Rambo | F02C 7/14 |
| 10,612,860 B2 * | 4/2020 | Ribarov | F28F 3/08 |
| 10,697,371 B2 * | 6/2020 | Sennoun | F02C 7/18 |
| 11,174,789 B2 * | 11/2021 | Rambo | F02C 7/224 |

(Continued)

FOREIGN PATENT DOCUMENTS

| | | |
|---|---|---|
| EP | 3246531 A1 | 11/2017 |
| WO | 2010051011 A1 | 5/2010 |
| WO | 2018055307 A1 | 3/2018 |

OTHER PUBLICATIONS

European Search Report for European Application No. 20167931.3 dated Sep. 30, 2020.

*Primary Examiner* — Stephanie Sebasco Cheng
(74) *Attorney, Agent, or Firm* — Carlson, Gaskey & Olds, P.C.

(57) ABSTRACT

A thermal management system for a gas turbine engine includes a cooler including a first portion and a second portion, the first portion for cooling a hot flow with a coolant and the second portion for cooling the coolant with a refrigerant. A vapor compression system circulates the refrigerant through the second portion of the cooler. The vapor compression system is a closed system in communication with at least one heat load in addition to the second portion of the cooler.

16 Claims, 2 Drawing Sheets

(56) References Cited

U.S. PATENT DOCUMENTS

| | | | |
|---|---|---|---|
| 2008/0190597 A1* | 8/2008 | Pantow | F01P 7/165 |
| | | | 165/287 |
| 2009/0159246 A1* | 6/2009 | Cornet | F01D 25/08 |
| | | | 165/138 |
| 2012/0000205 A1 | 1/2012 | Coffinberry et al. | |
| 2017/0233083 A1 | 8/2017 | Behrens et al. | |
| 2018/0080688 A1 | 3/2018 | Snape et al. | |
| 2020/0130858 A1* | 4/2020 | Julien | F01P 3/00 |
| 2020/0332712 A1* | 10/2020 | Ribarov | F28D 9/0093 |
| 2020/0332714 A1* | 10/2020 | Ribarov | F25B 1/08 |
| 2020/0332715 A1* | 10/2020 | Ribarov | F28D 9/0093 |
| 2020/0332716 A1* | 10/2020 | Ribarov | F02C 7/185 |

* cited by examiner

DYNAMIC THERMAL LOAD MONITORING AND MITIGATION FOR AIRCRAFT SYSTEMS

CROSS-REFERENCE TO RELATED APPLICATIONS

This application claims priority to U.S. Provisional Application No. 62/835,064 which was filed on Apr. 17, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow that expands through the turbine section to drive the compressor and the fan section.

Thermal loads generated during engine operation are cooled utilizing ram air flow, engine bleed air flow, and fuel flow. The use of ram air flow is limited due to increase in aerodynamic parasitic friction (i.e., "ram air drag"). The use of engine bleed air is limited due to efficiency penalties incurred by drawing airflow from parts of the engine. Fuel degrades at high temperatures and therefore also has a limited capacity to absorb heat. In addition, during flight, as the fuel is consumed by the engines, the fuel's mass availability decreases, and, hence, the fuel's availability as a heat sink is diminished.

Turbine engine manufacturers continue to seek further improvements to engine performance including improvements to thermal transfer efficiencies.

SUMMARY

A thermal management system for a gas turbine engine according to an exemplary embodiment of this disclosure includes, among other possible things, a cooler including a first portion and a second portion, the first portion for cooling a hot flow with a coolant and the second portion for cooling the coolant with a refrigerant. A vapor compression system circulates the refrigerant through the second portion of the cooler. The vapor compression system is a closed system in communication with at least one heat load in addition to the second portion of the cooler.

In a further embodiment of the foregoing thermal management system for a gas turbine engine, the first portion comprises a fuel/oil cooler and the second portion comprises a refrigerant/fuel cooler.

In a further embodiment of any of the foregoing thermal management systems for a gas turbine engine, a flow of fuel is communicated through the first portion to cool a flow of oil and an excess flow of fuel flows through the second portion and is cooled by the refrigerant.

In a further embodiment of any of the foregoing thermal management systems for a gas turbine engine, the cooler is disposed downstream of a booster fuel pump and upstream of a high pressure fuel pump. The excess flow is communicated to the second portion of the cooler from a location after the high pressure fuel pump.

In a further embodiment of any of the foregoing thermal management systems for a gas turbine engine, the second portion functions as an evaporator of the vapor compression system.

In a further embodiment of any of the foregoing thermal management systems for a gas turbine engine, the vapor compression system includes a compressor powered by an electric motor.

In a further embodiment of any of the foregoing thermal management systems for a gas turbine engine, a refrigerant valve controls a flow of refrigerant to the at least one heat load and the second portion of the cooler.

In a further embodiment of any of the foregoing thermal management systems for a gas turbine engine, a fuel valve is disposed after an outlet of the second portion of the cooler for controlling a flow of fuel to a fuel source and to the at least one load.

In a further embodiment of any of the foregoing thermal management systems for a gas turbine engine, a control system controls the electric motor, the refrigerant valve and the fuel valve to tailor the flow of fuel and the flow of refrigerant to cool the at least one heat load in response to a determined cooling requirement.

A gas turbine engine according to an exemplary embodiment of this disclosure includes, among other possible things, a core engine including a compressor section for communicating compressed airflow to a combustor section where the compressed air is mixed with fuel and ignited to generate a high-energy flow that expands through the turbine section, a fuel system for communicating a flow of fuel to the combustor, and a lubrication system for communicating an oil flow to components of the core engine. A thermal management system includes a cooler including a fuel/oil cooler portion and a refrigerant/fuel cooler portion, and a vapor compression system circulating the refrigerant through the refrigerant/fuel cooler portion of the cooler. The vapor compression system is a closed system in communication with at least one heat load in addition to the refrigerant/fuel cooler portion. A flow of fuel is communicated through the fuel/oil cooler portion to cool a flow of oil and an excess flow of fuel flows through the refrigerant/fuel cooler portion and is cooled by the refrigerant.

In a further embodiment of the foregoing gas turbine engine, the cooler is disposed downstream of a booster fuel pump and upstream of a high pressure fuel pump and the excess fuel flow is communicated to the refrigerant/fuel portion of the cooler from a location after the high pressure fuel pump.

In a further embodiment of any of the foregoing gas turbine engines, the refrigerant/fuel portion of the cooler functions as an evaporator of the vapor compression system.

In a further embodiment of any of the foregoing gas turbine engines, the vapor compression system includes a compressor powered by an electric motor.

In a further embodiment of any of the foregoing gas turbine engines, a refrigerant valve controls a flow of refrigerant to the at least one heat load and the refrigerant/fuel portion of the cooler.

In a further embodiment of any of the foregoing gas turbine engines, a fuel valve is disposed after an outlet of the refrigerant/fuel portion of the cooler for controlling a flow of fuel to a fuel source and to the at least one load.

In a further embodiment of any of the foregoing gas turbine engines, a control system controls the electric motor, the refrigerant valve and the fuel valve to tailor the flow of fuel and the flow of refrigerant to cool the at least one heat load in response to a determined cooling requirement.

A method of managing heat loads of a gas turbine engine according to an exemplary embodiment of this disclosure includes, among other possible things, measuring a temperature of at least one heat load, and measuring a temperature of a flow of fuel within a fuel system and communicating the measured temperature of the fuel to a controller. A temperature of a flow of refrigerant in a vapor compression system is measured and communicated to the controller. The vapor compression system includes a refrigerant/fuel cooler. The refrigerant/fuel cooler is operated as an evaporator for the vapor compression system and to cool the flow of fuel. At least one valve is operated with the controller to control at least one of a flow of fuel and a flow of refrigerant to maintain the heat load within a predefined temperature range.

In a further embodiment of the foregoing method of managing heat loads of a gas turbine engine, a fuel/oil cooler in combination with the refrigerant/fuel cooler and including cooling the oil with a flow of fuel through the fuel/oil cooler.

In a further embodiment of any of the foregoing methods of managing heat loads of a gas turbine engine, operating the valve comprises operating a fuel valve to direct fuel between a heat load and a fuel tank and operating a refrigerant valve to direct fuel between the heat load and the refrigerant/fuel cooler.

In a further embodiment of any of the foregoing methods of managing heat loads of a gas turbine engine, the vapor compression system includes a compressor driven by an electric motor. The controller varies operation of the electric motor to vary the speed of the compressor, which, in turn, can vary a flow of refrigerant through the vapor compression system responsive to the measured temperature of at least one of the flow of fuel, the flow of refrigerant or the at least one heat load.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
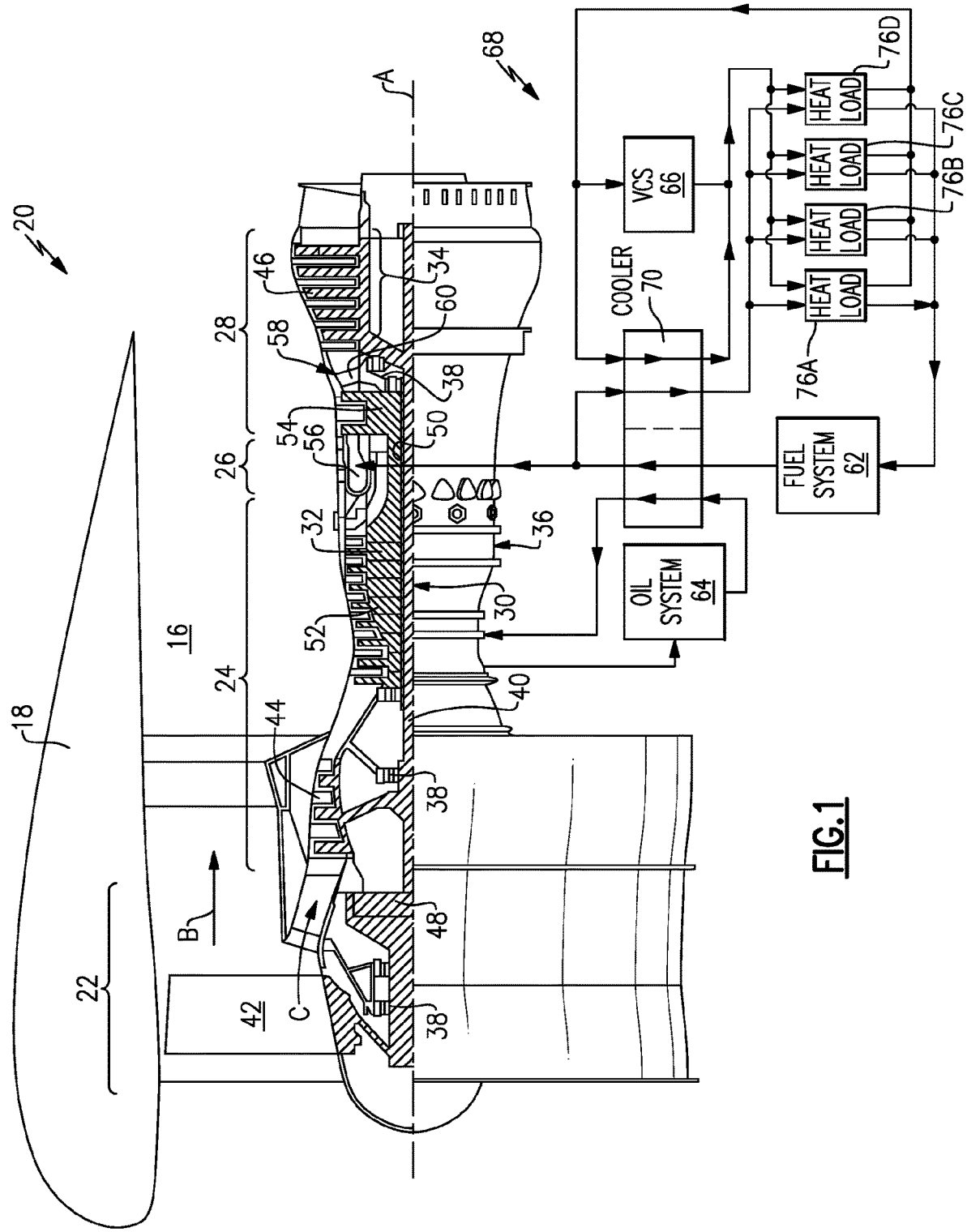
FIG. 1 is a schematic view of an example gas turbine engine.

FIG. 1 schematically illustrates a gas turbine engine 20 for powering an aircraft. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct 16 defined radially within a nacelle 18. The fan section 22 also drives air along a core flow path C for compression and communication into the combustor section 26 where the air is mixed with fuel and ignited to generate a high-energy gas flow that expands through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion of the combustion gases. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

The majority of the thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about (1.45:1). "Low corrected fan tip speed" is the actual fan tip speed in ft/sec divided by an industry standard temperature correction of [(Tram ° R)/(518.7° R)] 0.5. The "Low corrected fan tip speed" as disclosed herein according to one non-limiting embodiment is less than about 1150 ft/s (350.5 m/s).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 5 turbine rotors schematically indicated at 34. In another disclosed embodiment, the low pressure turbine includes about 6 rotors. In another non-limiting example embodiment, the low pressure turbine 46 includes about 3 turbine rotors. In yet another disclosed embodiment, the number of turbine rotors for the low pressure turbine 46 may be between 3 and 6. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The engine includes a fuel system 62 that directs fuel to the combustor 56. Fuel is utilized as a coolant to other systems and is routed through a cooler as is schematically shown at 70. An oil system 64 circulates lubricating oil to components of the engine including the bearing systems 38 and the geared architecture 48. Oil within the oil system 64 is heated during operation and is directed to the cooler 70 for cooling by a flow of fuel. Fuel provides a favorable medium for transference of thermal energy because preheated fuel provides for increased combustor efficiency. However, the thermal capacity of the fuel is limited because elevated temperatures can degrade the fuel and result in undesirable decomposition. The disclosed engine 20 includes a thermal management system (TMS) 68 that includes a vapor compression system (VCS) 66 and portions of the fuel system 62. The TMS 68 cools fuel flow and increase the capacity of the fuel to accept heat. Additionally, a refrigerant flow from the VCS 66 is also utilized to cool various heat loads schematically indicated at 76A-D. The heat loads 76A-D may include heat loads from various electrical devices and systems including an environmental control system (ECS), high-load/low duty-cycle applications, electric generators, electronic warning systems, actuators, flight controls, heaters/refrigerators, de-icing/anti-icing systems as well as any other heat producing system(s) of the engine or aircraft.

Figure 2:
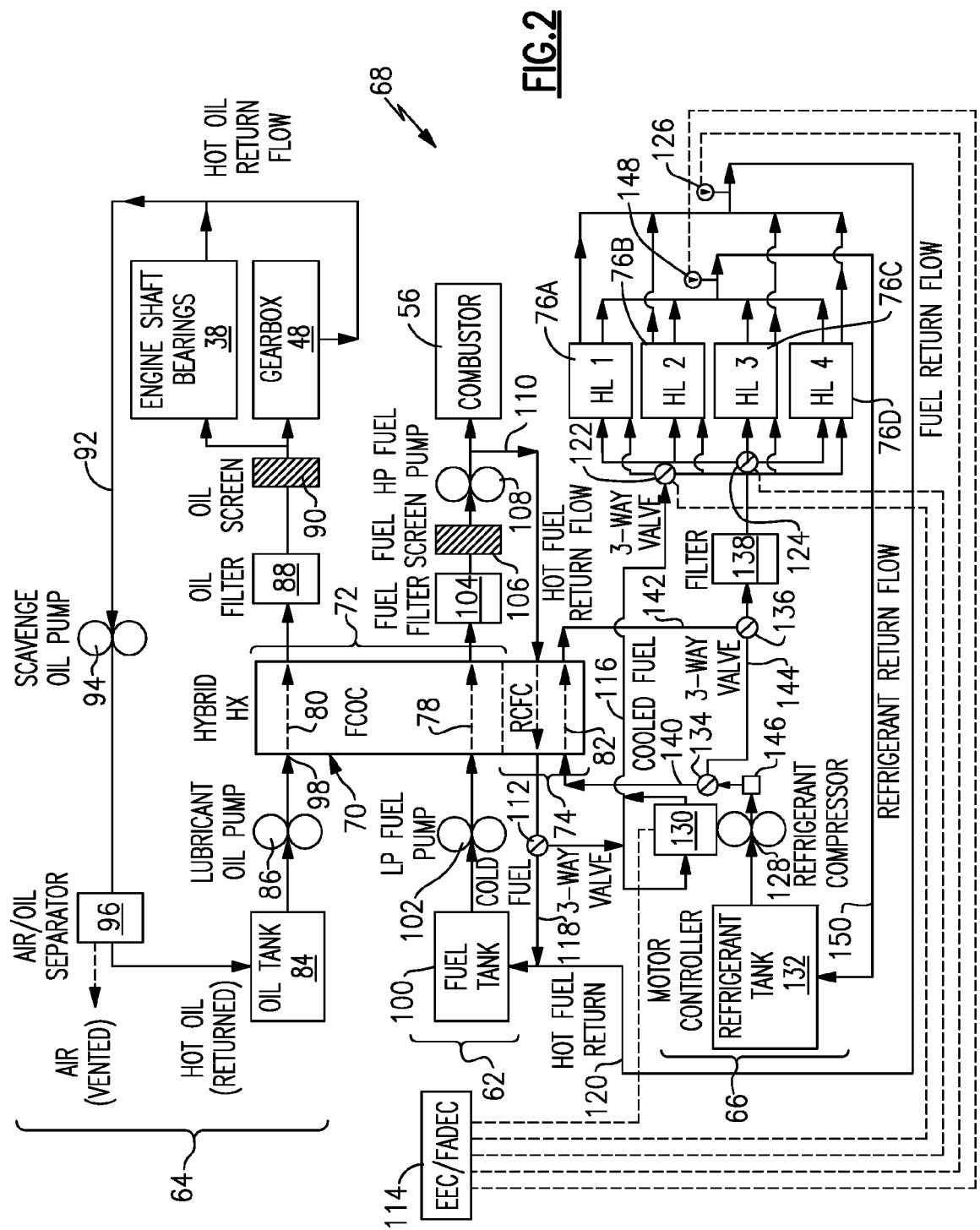
FIG. 2 is a schematic view of an example thermal management system embodiment.

Referring to FIG. 2 with continued reference to FIG. 1, the example fuel system 62, oil system 64 and VCS 66 that define portions of the disclosed TMS 68 are schematically shown.

The oil system 64 includes a primary pump 86 that draws oil form an oil tank 84 and directs a flow of oil 80 to an inlet 98 of a first portion 72, Fuel-Cooled Oil Cooler (FCOC), of the cooler 70. The first portion of the example cooler 70 is a fuel/oil cooler where a flow of fuel 78 cools the flow of oil 80. The cooled oil flows through an oil filter 88 and an oil screen 90 and then to the various engine components that require oil lubrication and cooling, for example, the bearing systems 38 and the geared architecture 48. It should be appreciated that other engine systems that require lubricant oil would also receive a portion of the cooled oil flow. As it is also appreciated, although not shown, the cooled oil flow may also be used itself as a heat sink to another separate (and unmixable) oil flow circuit, e.g., oil circuit for cooling/lubricating an integrated drive generator (IDG). Heated oil from the various engine systems is gathered and returned through a return passage 92 and can be further pumped by a scavenge pump 94 through an air/oil separator 96 and back to the oil tank 84.

The fuel system 62 includes a boost pump 102 that draws fuel from a fuel tank 100 and directs the flow of fuel 78 through the fuel/oil cooler portion 72 of the cooler 70. Heated fuel exiting the fuel/oil cooler 72 passes through a fuel filter 104, a fuel screen 106 and then to a high pressure fuel pump 108. The high pressure pump 108 supplies fuel flow to the combustor 56 at suitable pressures and flow rates.

Excess fuel that is not needed by the combustor 56 is sent through a hot fuel return passage 110. The hot fuel return passage 110 passes through a second portion of the cooler 74, Refrigerant-Cooled Fuel Cooler (RCFC). The second portion of the cooler 74 is a refrigerant/fuel cooler that cools the hot fuel with a refrigerant flow 82.

Fuel emerging from the refrigerant/fuel cooler 74 is directed by a fuel control valve 112 either back to the fuel tank 100 through passage 118 or through passage 116 to cool at least one of several different heat loads 76A-D. Although, four heat loads are shown by way of example, any number of heat loads are contemplated for this system and the four heat loads 76A-D represent many different heat loads located throughout the engine and aircraft. In this example, another valve 122 is provided to direct and allocate fuel between the different heat loads 76A-D. Fuel may also be directed to cool motor 130 that drives the refrigerant compressor 128.

The heat loads 76A-D are shown schematically and can be an engine or aircraft system or device that requires cooling. The heat loads 76A-D may be electrical devices such as motors or avionic components that operate within predefined temperatures. The valve 122 is disclosed as a 3-way valve but may be of any configuration to distribute cooled fuel flow to the heat load 76A-D. Moreover, although a single valve 122 is shown, any number of valves could be utilized and controlled as may be needed to distribute and proportion cooling flow across different heat loads 76A-D.

A temperature sensor 126 measures a temperature of fuel flow exiting the heat loads 76A-D as it is communicated back through a hot fuel return passage 120 to the fuel tank 100. As appreciated, fuel may be communicated to cool the heat loads 76A-D in a parallel configuration as is shown or serially (not shown) or mixed (not shown) depending on application specific cooling requirements.

The fuel is cooled by the refrigerant flow 82 of the VCS 66 in the refrigerant/fuel cooler 74. The VCS 66 includes an electric motor 130 driving a compressor 128 that draws refrigerant from a tank 132. The example motor 130 includes a motor controller to enable adjustment of motor operation to tailor operation of the compressor 128. The VCS 66 includes a condenser and expansion valve shown schematically at 146 that operate as understood for conventional refrigerant vapor compression systems.

A pair of valves 134, 136 direct refrigerant flow through a combination of passages 140, 142 and 144 to either flow through the refrigerant/fuel cooler 74 to cool the fuel flow or to heat loads 76A-D. Refrigerant flow through the passages 140, 142 and 144 can be proportioned between the refrigerant/cooler 74 and the heat loads 76A-D as needed to accommodate management of rejected waste heat. Refrigerant flows through a refrigerant filter 138 prior to cooling the heat loads 76A-D. Refrigerant flow to the heat loads 76A-D is distributed by a valve 124 to the heat loads 76A-D according to cooling requirements. As with the fuel distribution valve 122, the refrigerant distribution valve 124 may be a proportional valve or a group of valves provided to proportionally distribute cooling refrigerant flow to the different heat loads 76A-D. A temperature of the refrigerant flow is measured by sensor 148 in a return flow line 150. Refrigerant can be any suitable non-ozone depleting fluid such as blends from the HFC (hydrofluorocarbons) and/or PFC (perfluorocarbons) families of modern refrigerants. These blends can also include any other mixtures (or any suitable proportions) of propylene glycol and water (PGW), poly-alpha olefins (PAO), and the like.

The disclosed TMS 68 includes a controller 114 that may be a separate controller for the TMS 68 or part of the overall engine or aircraft controller (Electronic Engine Control-EEC/Full Authority Digital Engine Control-FADEC). The controller 114 as referred to in this disclosure may be a hardware device for executing software, particularly software stored in memory. The controller may include a processor. The processor may be custom made or a commercially available processor, a central processing unit (CPU), an auxiliary processor among several processors associated with the computing device, a semiconductor based microprocessor (in the form of a microchip or chip set) or generally any device for executing software instructions.

The controller 114 will include a memory that can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller 114 operates the TMS 68 to deep-cool the fuel flow with the refrigerant flow 82 of the VCS 66. The deep-cooled fuel increases the capacity of the fuel to absorb waste heat from the different heat loads 76A-D and the oil system 64. Moreover, the VCS 66 further augments the cooling capacity of the TMS 68 by directly cooling heat loads according to determined and/or anticipated waste heat loads.

The TMS 68 constantly receives temperature information from the temperature sensors 126, 148 as well as other information on engine operation to determine cooling requirements and adjusts operation to address and the determined requirements. The controller 114 operates the valves 112, 134, 136, 122 and 124 to direct and proportion cooling flow based on the measured temperatures of the fuel and refrigerant flow. The controller 114 may further adjust operation of the compressor 128 by controlling the electric motor 130 to adjust refrigerant flow through the VCS 66.

The disclosed TMS 68 dynamically monitors and adapts fuel and refrigerant flows to absorb waste heat from the various heat loads 76A-D and the lubricant. The TMS 68 accumulates temperature information of the different flows and heat loads to efficiently tailor cooling flow to current and/or anticipated heat loads. Moreover, the controller 114 may monitor the engine operation cycle to anticipate upcoming heat loads and direct coolant flow accordingly. The controller 114 may direct coolant flows by operation of the various valves 112, 134, 136, 122, 124, and compressor 128.

Moreover, the controller 114 may predict cooling needs by operation of various engine components. For example, an increase in the speed of the motor 130 can be utilized as a factor in predicting an increased demand for cooling by the VCS 66. Moreover, the rotational speed of the refrigerant compressor 128 provided by the motor 130 can be used as an indication of an instant cooling capacity by the VCS 66 as part of the TMS 68. Information on the instant cooling capability of the VCS 66 is useful to enable prediction and anticipated management of future heat loads. Moreover, when a maximum cooling capacity is approached, the TMS 68 can provide information utilized by the controller 114 to reduce non-essential heat loads to preserve operability of primary systems. Additionally, predictive operation of the TMS 68 minimizes disruptions and reductions to the engine operating efficiencies.

Accordingly, the example TMS 68 provides an integrated and intelligent means of addressing measured and anticipated variations in heat loads across multiple engine and aircraft systems.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A thermal management system for a gas turbine engine comprising: a cooler including a first portion and a second portion,
    the first portion for cooling a hot flow of oil with a flow of fuel, a first part of the flow of fuel being supplied to the gas turbine engine after being heated by the flow of oil, and
    the second portion for cooling a second part of the flow of fuel heated by the flow of oil with a refrigerant; and
    a vapor compression system circulating the refrigerant through the second portion of the cooler, wherein the vapor compression system is a closed system in communication with at least one heat load in addition to the second portion of the cooler.

2. The thermal management system as recited in claim 1, wherein the first portion comprises a fuel/oil cooler and the second portion comprises a refrigerant/fuel cooler.

3. The thermal management system as recited in claim 2, wherein the flow of fuel is communicated through the first portion to cool the flow of oil, and the second part of the flow of fuel, heated by the flow of oil cooled by the refrigerant, is an excess flow of fuel.

4. The thermal management system as recited in claim 3, wherein the cooler is disposed downstream of a booster fuel pump and upstream of a high pressure fuel pump and the excess flow of fuel is communicated to the second portion of the cooler from a location downstream of the high pressure fuel pump.

5. The thermal management system as recited in claim 3, wherein the second portion functions as an evaporator of the vapor compression system.

6. The thermal management system as recited in claim 5, wherein the vapor compression system includes a compressor powered by an electric motor.

7. The thermal management system as recited in claim 6, including a refrigerant valve controlling a flow of the refrigerant to the at least one heat load and the second portion of the cooler.

8. The thermal management system as recited in claim 7, including a fuel valve disposed downstream of an outlet of the second portion of the cooler for controlling communication of the excess flow of fuel to a fuel source and to the at least one heat load.

9. The thermal management system as recited in claim 8, including a control system controlling the electric motor, the refrigerant valve, and the fuel valve to tailor communication of the excess flow of fuel and the flow of refrigerant to cool the at least one heat load in response to a determined cooling requirement.

10. A gas turbine engine comprising:
a core engine including a compressor section for communicating a compressed airflow to a combustor section where the compressed airflow is mixed with a fuel and ignited to generate a high-energy flow that expands through a turbine section of the gas turbine engine;
a fuel system for communicating a flow of the fuel to the combustor section;
a lubrication system for communicating an oil flow to components of the core engine; and
a thermal management system including a cooler including a fuel/oil cooler portion and a refrigerant/fuel cooler portion, and
a vapor compression system circulating a refrigerant through the refrigerant/fuel cooler portion of the cooler, the vapor compression system being a closed system in communication with at least one heat load in addition to the refrigerant/fuel cooler portion,
wherein the flow of the fuel is communicated through the fuel/oil cooler portion to cool the oil flow, a first part of the flow of the fuel being supplied to the combustor section after being heated by the oil flow, and a second part of the flow of the fuel, heated by the oil flow, is an excess flow that flows through the refrigerant/fuel cooler portion and is cooled by the refrigerant.

11. The gas turbine engine as recited in claim 10, wherein the cooler is disposed downstream of a booster fuel pump and upstream of a high pressure fuel pump and the excess flow of fuel is communicated to the refrigerant/fuel cooler portion of the cooler from a location downstream of the high pressure fuel pump.

12. The gas turbine engine as recited in claim 11, wherein the refrigerant/fuel cooler portion of the cooler functions as an evaporator of the vapor compression system.

13. The gas turbine engine as recited in claim 12, wherein the vapor compression system includes a compressor powered by an electric motor.

14. The gas turbine engine as recited in claim 13, including a refrigerant valve controlling a flow of the refrigerant to the at least one heat load and the refrigerant/fuel cooler portion of the cooler.

15. The gas turbine engine as recited in claim 14, including a fuel valve disposed downstream of an outlet of the refrigerant/fuel cooler portion of the cooler for controlling communication of the excess flow to a fuel source and to the at least one heat load.

16. The gas turbine engine as recited in claim 15, including a control system controlling the electric motor, the refrigerant valve, and the fuel valve to tailor communication of the excess flow and the flow of the refrigerant to cool the at least one heat load in response to a determined cooling requirement.

* * * * *